United States Patent
Ross et al.

(10) Patent No.: US 10,341,868 B2
(45) Date of Patent: Jul. 2, 2019

(54) PLATFORM FOR COMPUTING AT THE MOBILE EDGE

(71) Applicant: ACS (US), Inc., Huntington Beach, CA (US)

(72) Inventors: Nicholas Ross, Aliso Viejo, CA (US); Robert Pike, Apollo Beach, FL (US)

(73) Assignee: SMART-EDGE.COM, INC., Norcross, GA (US)

( * ) Notice: Subject to any disclaimer, the term of this patent is extended or adjusted under 35 U.S.C. 154(b) by 85 days.

(21) Appl. No.: 15/441,373

(22) Filed: Feb. 24, 2017

(65) Prior Publication Data
US 2017/0251368 A1    Aug. 31, 2017

Related U.S. Application Data

(60) Provisional application No. 62/299,673, filed on Feb. 25, 2016.

(51) Int. Cl.
*G06F 21/60* (2013.01)
*H04L 29/06* (2006.01)
(Continued)

(52) U.S. Cl.
CPC .......... *H04W 12/08* (2013.01); *G06F 21/604* (2013.01); *H04L 41/0803* (2013.01);
(Continued)

(58) Field of Classification Search
CPC ..... H04L 41/0803; H04L 67/10; H04L 47/70; H04L 63/123; H04L 63/101;
(Continued)

(56) References Cited

U.S. PATENT DOCUMENTS

| 8,499,031 B1 | 7/2013 | Kirby, Jr. |
| 2009/0132813 A1 | 5/2009 | Schibuk |

(Continued)

OTHER PUBLICATIONS

Patel et al. Mobile-Edge Computing, Publication date: Sep. 2014 (Year: 2014).*

(Continued)

*Primary Examiner* — Alexander Lagor
*Assistant Examiner* — Vu V Tran
(74) *Attorney, Agent, or Firm* — Buchanan Ingersoll & Rooney PC

(57) ABSTRACT

Disclosed is a platform for providing computational resources at and/or near a mobile network perimeter. The platform may be used to provide computational resources adjacent a small cell radio via at least one Mobile Edge Compute ("MEC") Appliance and at least one MEC Controller. The MEC Appliance can serve as the data plane to support data flow traffic. The MEC Controller can provide a micro-services architecture designed for resiliency, scalability, and extensibility. The platform can be used to de-centralize the mobile network operator's core network and/or associated macro-cell network topologies, generating a platform with enhanced flexibility, reliability, and performance. The platform can include a security architecture for effective privacy and access within a distributed topology of the network at and/or near the edge of the mobile network perimeter.

24 Claims, 10 Drawing Sheets

(51) Int. Cl.
*H04L 12/911* (2013.01)
*H04L 12/24* (2006.01)
*H04W 12/08* (2009.01)
*H04W 12/06* (2009.01)
*H04W 16/18* (2009.01)
*H04W 12/10* (2009.01)
*H04W 4/60* (2018.01)
*H04W 12/12* (2009.01)

(52) U.S. Cl.
CPC .............. *H04L 41/12* (2013.01); *H04L 47/70* (2013.01); *H04L 63/0892* (2013.01); *H04L 63/101* (2013.01); *H04L 63/123* (2013.01); *H04L 63/1433* (2013.01); *H04W 4/60* (2018.02); *H04W 12/06* (2013.01); *H04W 12/10* (2013.01); *H04W 16/18* (2013.01); *H04W 12/12* (2013.01)

(58) Field of Classification Search
CPC .... H04L 63/1433; H04L 41/01; H04W 12/08; H04W 16/18; H04W 4/60; H04W 12/10; H04W 12/06; H04W 12/12; G06F 21/604
See application file for complete search history.

(56) References Cited

U.S. PATENT DOCUMENTS

| | | |
|---|---|---|
| 2009/0300156 A1 | 12/2009 | Yalakanti et al. |
| 2011/0265164 A1* | 10/2011 | Lucovsky ........... G06F 9/45533 726/7 |
| 2012/0260329 A1 | 10/2012 | Suffling |
| 2014/0341109 A1* | 11/2014 | Cartmell ............... H04L 45/308 370/328 |
| 2015/0033012 A1* | 1/2015 | Scarlata ................ H04L 9/3242 713/161 |
| 2015/0195414 A1* | 7/2015 | Raleigh ............ G06Q 10/06375 370/252 |
| 2015/0304736 A1* | 10/2015 | Lal .......................... G06F 21/10 380/210 |
| 2015/0326535 A1* | 11/2015 | Rao ..................... H04L 41/5054 726/15 |
| 2016/0156656 A1* | 6/2016 | Boggs ................. H04L 63/1433 726/25 |
| 2017/0024569 A1* | 1/2017 | Xing ....................... G06F 13/28 |
| 2017/0353319 A1* | 12/2017 | Scarlata .................. G06F 21/53 |
| 2018/0018288 A1* | 1/2018 | Dewan .................. G06F 3/0622 |

OTHER PUBLICATIONS

M. Satyanarayanan et al., "Edge Analytics in the Internet of Things," in IEEE Pervasive Computing, vol. 14, No. 2, pp. 24-31, Apr.-Jun. 2015. (Year: 2015).*

Notification of Transmittal of the International Search Report and the Written Opinion of the International Searching Authority, International Search Report and Written Opinion of the International Searching Authority for PCT/US2017/019247, dated May 11, 2017 (11 pages).

* cited by examiner

PLATFORM FOR COMPUTING AT THE MOBILE EDGE

CROSS-REFERENCE TO RELATED APPLICATIONS

This patent application claims the benefit of U.S. Provisional Patent Application No. 62/299,673 filed on Feb. 25, 2016, which is hereby incorporated by reference in its entirety.

FIELD OF THE INVENTION

Embodiments of the present invention relate to a platform of software and hardware components for providing computational resources at and/or or near a mobile network perimeter.

BACKGROUND OF THE INVENTION

In network systems and, in particular, wireless network systems/structures, a network perimeter exists at the boundary between the private managed side of the network and the provider managed side of the network. Prior to mobile and cloud technologies, the network perimeter was the services horizon of the privately managed network (e.g., a physical boundary of a campus or office building) at which the services from the privately managed network extend to. However, with the advent of mobile and/or cloud technologies, the network perimeter has become more amorphous, extending beyond the "physical" services horizon, but still being confined to the privately managed platform. For example, client devices can operate on privately managed networks while being within a publicly managed network due to the client device being operated at a remote location from the corporate office. Thus, with mobile and cloud technologies, client devices and applications can operate on extended networks, where the network perimeter can be the borders between the trusted privately managed network and the untrusted publicly managed network.

Providing computational resources at and/or near the network perimeter can result in operation within an untrusted and/or hostile environment, which may compromise security. Yet, balancing security and operational efficacy can make it difficult to provide adequate protection strategies and security policies for client network devices and client network applications operating at and/or near the network perimeter. Generally, balancing security and operational needs within such operational environments tends to hinder extensibility and scalability aspects of platforms providing such computational resources.

The present disclosure is directed at overcoming one or more of the above-mentioned problems.

SUMMARY OF THE INVENTION

Disclosed herein is a platform of software and hardware components for providing computational resources at and/or near a mobile network perimeter. The platform may be used to provide computational resources adjacent a small cell radio via at least one Mobile Edge Compute ("MEC") Appliance provided at or near a network perimeter and at least one MEC Controller. Implementation of the MEC Controller and MEC Appliance within a network can generate a platform that is secure (e.g., a secure sandbox) and one that facilitates scalability and extensibility within a distributed network (e.g., use of multiple client devices within a network). In addition, the platform can further facilitate hosting of third party applications used by either client devices and/or mobile network operators ("MNO").

In some embodiments, the MEC Appliance can serve as the data plane to support data flow traffic between the client device and the network. For example, the MEC Appliance can be used for running third party applications on client devices by implementing a multi-tenant environment via a sandboxing scheme. In some embodiments, the MEC Controller can serve as the control plane, providing out of band control of the configuration, policy management, and operation of all managed MEC Appliance devices. The MEC Controller itself can use or implement a micro-services architecture designed for resiliency, scalability, and extensibility. The platform can be used to de-centralize the MNO's core network and/or associated macro-cell network topologies, generating a platform that is more flexible, reliable, and performant than existing platforms.

The inventive platform can include a security architecture for effective privacy and access within the distributed topology at and/or near the network perimeter. This can be achieved by implementing a Security Module that is integral to the functioning of the MEC Controller and for which extends throughout each MEC Appliance. The Security Module can be configured to validate any action by any platform component within, at and/or near the network perimeter environment before being granted access to the network or given permission to issue commands that will change the configuration or state of one or more components in the operational environment of the MEC Appliance. In some embodiments, the framework of the Security Module can be a plurality of components establishing a plurality of layers, each component structured to address various attack vectors and potential exploits at each layer to minimize the risk of unauthorized access.

Instead of small cell radios initiating an Internet Protocol security ("IPSec") tunnel to MNO's security gateway, the MEC Appliance can install itself in that data path, acting as an IPSec server to the small cell radio and an IPSec client device to the MNO's security gateway servers. The MEC Controller can include a Core Services Platform designed as a micro-services architecture, providing central control and aggregation of all capabilities provided by the platform, which can isolate the scope of specific functions to a set of dedicated instances that can be independently scaled. Additionally, integration with the MEC Controller can be done strictly through a Public Gateway Module within the Core Services Platform, allowing for third party integration and control in conjunction with, or as a replacement to, gateway modules.

Some embodiments can include a Discovery Service module as a component of the platform responsible for the provisioning of a MEC Appliance in the field, which can include autonomous provisioning within the at/near network perimeter environment.

With the de-centralized approach, along with the Security Module, the platform can deploy or "push" mobile applications to and/or near the network perimeter environment edge, resulting in mobile applications located at the closest proximity to an end user that is technically possible. Additionally, MNOs and/or client device users with appliances located within, at and/or near the network perimeter environment can easily and effectively scale up and/or down based on demand, with minimal or no disruption to other modules within the platform.

While these potential advantages are made possible by technical solutions offered herein, they are not required to be achieved. The presently disclosed invention can be implemented to achieve technical advantages, whether or not these potential advantages, individually or in combination, are sought or achieved.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present invention will be more apparent from the following more particular description thereof, presented in conjunction with the following drawings, in which.

DETAILED DESCRIPTION OF THE INVENTION

Figure 1:
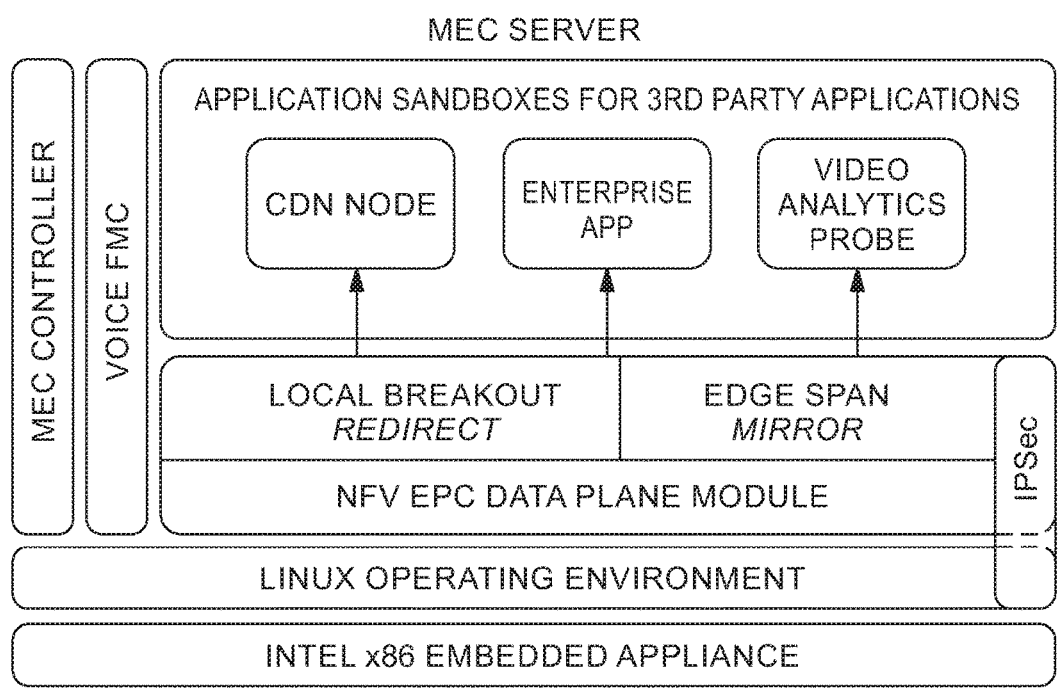
FIG. 1 shows an exemplary Mobile Edge Compute ("MEC") server configuration that may be used with the inventive platform.

The following description is of an embodiment presently contemplated for carrying out the present invention. This description is not to be taken in a limiting sense, but is made merely for the purpose of describing the general principles and features of the present invention. The scope of the present invention should be determined with reference to the claims.

Disclosed is a platform of software and hardware components for providing computational resources at and/or near a mobile network perimeter. The platform can be used within a wireless network capable of connecting with a privately managed network (e.g., the Internet or private Internet). The wireless network can include at least one server (e.g., a server computer) enabling communication between a client device (e.g., personal computer, touch pad, mobile smart phone, etc.) of the privately managed network and the server and/or another client device. The server may include a radio modem capable of facilitating communication with the wireless network. The server may further include a network interface capable of facilitating communication with the privately managed network and/or other network. Thus, the server can act as a gateway between networks. The gateway function of the server can make any necessary translations in data being transmitted between networks. In some embodiments, the privately managed network can operate on a Transmission Control Protocol/Internet Protocol ("TCP/IP") protocol, and the wireless network may be in communication with the privately managed network via a router implemented within the server.

The inventive platform may be used to provide computational resources (e.g., hardware and software components, modules, applications, appliances, etc.) adjacent a small cell radio. A small cell radio may be employed in the wireless network as an access node for wireless connectivity. In addition, a combination of a small cell radio with a MEC device can be used to generate a smart cell radio. A smart cell radio may be employed in the wireless network as an access node for wireless connectivity across multiple spectrum ranges and technologies. Smart cell connections are not based on static spectrums (i.e., not dependent on the configuration of the antenna used). Instead, smart cell connections can transmit multiple frequencies and technologies due to their ability to control the spectrums via software. Wireless connectivity can be achieved through other means, including connections based on static spectrums, such as, for example, Macrocells, Wi-Fi, etc.

The inventive platform can include at least one Mobile Edge Compute ("MEC") Appliance placed at or near a network perimeter and at least one MEC Controller. In some implementations, the MEC Appliance can be placed in-line between a small cell and a mobile network operator ("MNO"), and the MEC Controller can reside within the MNO's core network. The mobile operator's core network can be a central portion of the mobile network, which can include a macro-cell (e.g., cellular base station, cell tower, etc.), providing services to client devices connected to the mobile network by an access network. Orchestrated implementation of the MEC Controller and MEC Appliance can generate a secure platform for computing at and/or near a network perimeter under a distributed network (e.g., use of multiple client devices within the network(s)). The inventive platform can further facilitate extensibility and scalability, enabling client device users and/or MNO s to expand, add, remove, and/or modify a network's capabilities. The inventive platform can further facilitate hosting of third party applications used by either the client devices and/or the MNOs. A third party can be an entity that the MNO grants permission to for delegated control of an administratively defined scope of the network's environment.

The MEC Appliance is a hardware component that may be configured to provide data services and security mechanisms for running programs from third parties, which may include untrusted programs from unverified third parties. In some embodiments, the MEC Appliance can serve as the data plane to support data flow traffic between the client device and the network. For example, the MEC Appliance can be part of the router architecture that determines the route of the data. Computing standards can be used by the MEC Appliance to provide additional features, components, and/or capabilities that allow the MEC Appliance to be deployed and managed at scale in any type of environment within the network. For example, the MEC Appliance can be used for running third party applications on client devices by implementing a multi-tenant environment (i.e., a plurality of client devices within the network) via sandboxing schemes embodied in programming configurations of the MEC Appliance to control resources such as memory, file descriptors, and/or system space while running third party applications on the MEC Appliance. In one implementation, the MEC Appliance may be used to integrate directly with 3rd Generation Partnership Project ("3GPP") standard Evolved Packet Core ("EPC") interfaces (e.g., 3G, LTE, 4G, etc.) for providing data processing services for all data traffic originating from client devices within the at/near network perimeter environment. In at least one embodiment, all data services allow for selective routing of data traffic to local applications and/or services. Data services may also allow for the selective duplication and delivery of all traffic to local or remote applications and/or services for the purposes of inspecting and analyzing the traffic.

The MEC Controller is a collection of hardware and software components that may be structured for command and control of all MEC Appliances for a given MNO. The MEC Controller can provide capabilities that extend into the MEC Appliance, the MNO, and/or a third party, and it may be used to operationalize MEC Appliances at scale. In some embodiments, the MEC Controller can serve as the control plane, providing policy and configuration parameters, via control logic, by which the MEC Appliance forwards the data. For example, the MEC Controller can be structured to enable selective access to an Access Point Name ("APN") of the network, where the APN can be used for services such as, but not limited to, unifying voice and data on an Internet Protocol ("IP") architecture so that voice can be treated as an IP application. In some embodiments, the MEC Controller can implement micro-services architecture internally to provide secure, modular, and scalable services to both the MEC Appliances and the MNOs.

The micro-services architecture may be designed for resiliency, scalability, and extensibility. For example, each component of the MEC Controller can be scaled horizontally (e.g., add more nodes to the network as opposed to adding resources to a single node) and extended independently. Each component of the MEC Controller can be further configured for fault and security isolation, as well as be cryptographically secured, including use of authenticated and encrypted communications. Furthermore, the MEC Controller can be primarily stateless, asynchronous, and operate via out-of-band communication activity. Thus, the MEC Controller can be operated without affecting performance or availability of MEC Appliances.

As noted above, orchestrated implementation of the MEC Controller and MEC Appliance can generate a secure platform for computing within, at and/or near the network perimeter environment under a distributed network. One way in which the inventive platform achieves this is employing the platform to de-centralize the MNO's core network and/or associated macro-cell network topologies. De-centralizing the topology with use of MEC Appliances and MEC Controllers can generate a platform that is more flexible, reliable, and more performant than existing platforms. In addition, a scalable platform can be available for all forms of client devices operating within, at and/or near the network perimeter environment, enabling a MNO to deploy a highly scalable, distributed computational pool of resources residing at and/or near the network perimeter. For example, the inventive platform can enable deploying resources that deliver a general purpose x86 platform ecosystem of third party applications to run on the network, facilitating instruction sets that can operate with input designed for any legacy system, product, or technology. These software resources do not need to be changed to accommodate the architecture of a mobile network and instead can be deployed as if they were running in a traditional enterprise Local Area Network ("LAN").

Such de-centralization may provide significant enhancements in cloud computing by enabling direct access between the client device and a running application, an operation herein referred to as Cloud Edge computing. In other words, unlike existing Infrastructure as a Service ("IaaS") or Platform as a Service ("PaaS") cloud computer services that operate outside of mobile networks, the inventive platform can allow the deployment of applications to the mobile network perimeter edge, resulting in the application located at the closest proximity to an end user (e.g., client device at/near the network perimeter) that is technically possible. To provide application developers with a platform facilitating a most distributed and lowest latency network for client devices using over-the-air transmission, the MEC Appliance can be further configured as a compact and powerful appliance programmed for a small user-to-host ratio.

As noted above, the inventive platform can be used for building a secured distributed network environment of x86 compute resources residing at and/or near the edge of the network perimeter. This can be achieved through orchestrated implementation of services supported by various components within the platform. For example, MEC Appliance services may include, but are not limited to: 1) configuration and policy enforcement; 2) reporting and monitoring; and 3) software distribution and versioning. MEC Controller and/or MNO services may include, but are not limited to: 1) Role Based Access Control ("RBAC") enabled Representational State Transfer ("REST") Application Program Interfaces ("API") to generate methods regulating access to the network via a software architecture of an open source information space (e.g., World Wide Web) for control of MEC Appliances and associated services, including support for delegated access to third party entities; 2) EPC integration for selective provisioning; and 3) offloaded and centralized operational metadata processing from MEC Appliances. Third party services may include, but are not limited to: 1) extending direct connectivity of a locally running service on adjacent server hardware to client devices; 2) integration into existing user authentication services; 3) integration into existing communication services; and 4) REST API for control of delegated and/or allowed actions.

The inventive platform can include security architecture for effective privacy and access within a distributed topology at and/or near the network perimeter environment. This can be achieved by implementation of a Security Module that is integral to the functioning of the MEC Controller and for which extends throughout the each MEC Appliance. For example, the Security Module can be used for white-listed access and control of the inventive platform. In some embodiments, all components in the MEC Controller and the MEC Appliance can be built on top of a framework of the Security Module. In one implementation, the framework of the Security Module can be a zero-trust model, whereby communications from any component within, at and/or near the network perimeter environment can be forced to prove its identity before being granted access to the network. In addition, the Security Module can be configured to validate any action of any platform component within, at and/or near the network perimeter environment before being granted access to the network. The Security Module can be further configured such that any inter-service communication can be permitted only when used with an encrypted session using Transport Layered Security ("TLS") protocols that ensure privacy between communication applications. In some implementations, the encrypted TLS sessions can be permitted through local interfaces and/or remote interfaces. In one implementation, the TLS protocol can require explicit authentication before access is granted to the network. This can be accomplished through use of X.509 certificates for every instance of a communication transmission.

Certificates may be used extensively throughout the security architecture for the TLS client device and for server authentication, as well as service/principle identity. For example, the inventive platform can be structured to anchor all certificates with either an extended chain of trust from an external Public Key Infrastructure ("PKI") environment, or a new root anchor may be established. Additionally, validation of actions can be in accordance with the following steps: 1) a request is made by a valid user; 2) the requested action is allowed for the authenticated user; and 3) the requested action is allowed for a defined scope of the action. Upon successful validation, a requested action can be cryptographically signed and transmitted to a destination service that is able to perform the action.

In some embodiments, the security framework can be a plurality of components establishing a plurality of layers, each component capable of being structured to address various attack vectors and potential exploits at each layer to minimize the risk of unauthorized access. A first security layer can be in the MEC Appliance and be built upon key encryption, using a hardware cryptographic unit, such as a Trusted Platform Module ("TPM"), physically attached to a local host for the storage of a master key used to encrypt all keys stored on the appliance. For example, the first security layer can use public and private keys for authentication and encryption, where no private key is shared between client devices and/or services. This can be achieved by ensuring that the private keys are protected through use of the TPM used to decrypt private keys, if present. It may be desired for private keys to never be shared between services or principles. Further, the security framework may be configured such that it can be the responsibility of the owner of the private key, whether it be a service, an MEC Appliance instance, or a human operating using the Public API, to protect its security. Use of a TPM module, if present, can add additional hardware protection of the keys for private keys associated with a service or appliance running in the inventive platform.

Use of the TPM can facilitate generation of the second security layer, which can be a trusted boot platform that verifies the integrity of an operating environment within the network. Within the operating environment can be a third security layer, which may be a runtime Security Module with security mechanisms to control the ability of an application and its users to interact with network elements. The runtime Security Module can use both process isolation and memory encryption. The use of process isolation may minimize the attack vectors available to an attacker by restricting access to system resources to only those resources needed for that process to operate. The use of memory encryption can provide additional protection from unauthorized access to sensitive data stored in-memory for a service running on a component in the inventive platform. A fourth security layer can be a security framework implemented by the actual application code running in the MEC Appliance and/or MEC Controller. Further embodiments can include more or less security layers.

As an exemplary embodiment, the security framework can be configured as a Security Module, which may provide Authentication, Authorization, and Accounting ("AAA") services to any principle requesting access to a MEC Controller API or for communication between components in the environment via an internal communication bus. The Security Module can implement an internal relational database for persistent storage of principle identities, roles, and permissions, providing the Security Module with a complete Role-Based-Access Control ("RBAC") policy framework for controlling access to the operation environment of the MEC Appliance. A principle in the Security Module may refer to a service instance that is part of the platform, an external service accessing the public API, or a human operator. The Security Module may delegate the authentication and authorization of a principle to an external identity provider service via the use of a Security Assertion Markup Language ("SAML") data format, for example. The Security Module can also provide comprehensive auditing of all principle activities, since it may be desired for actions performed by a principle to be received and cryptographically signed by the Security Module. The Security Module can also provide a Public Key Infrastructure ("PKI") for issuance and revocation of digital certificates used for principle authentication and identification. An anchor of trust in the PKI may be established by MEC Controller root certificate authority, or by a network operator's existing Certificate Authorities. The Security Module may build upon the AAA and PKI services to cryptographically identify a principle and validate that a scope of any requested actions, specifically services or devices that would be impacted by the action(s), and allow changes to be made by that principle.

The security framework can provide layers through: (1) authenticated connection establishment, wherein no principle is allowed to communicate with any other principle or service that does not use an encrypted session and for which is cryptographically authenticated using the principle's digital certificate; (2) isolation of communication, wherein all communication between modules that change or alter the state of the environment can be required to do so only by communicating via the Security Module because direct communication is not allowed; (3) restriction of authority, wherein modules outside of the Security Module can be configured to only receive instructions and provide responses resulting from the execution of those instructions, where all instructions may be sent as a request to the Security Module, and only a cryptographically signed instruction from the Security Module may be accepted by any other service in the environment to make a change to its respective configuration; (4) no assumption of trust for non-security module components, wherein the Security Module can be configured so that no components, including a new instance of a Security Module instance, are trusted to communicate in the environment unless explicitly authorized and issued a cryptographically signed digital certificate by an existing security module; and (5) isolation of scope and function, wherein the Security Module can be configured such that modules do not share function and, therefore, have independent attack vectors, meaning an exploit of one module does not directly impact the function or security of another module.

FIG. 1 shows an exemplary MEC server configuration that may be used with the inventive platform. The MEC Appliance can be an embedded x86 hardware device running a hardened Linux operating environment, an MEC Controller agent (i.e., an Appliance Services Agent), selected data plane network function virtualization ("NFV") EPC modules, and core third party applications. The Linux operating environment and NFV EPC data plane modules can receive and transmit data into and out of the MEC Appliance via a secure Internet Protocol ("IPsec") suite for authenticating and encrypting each IP packet of a communication session. The MEC Appliance can include the MEC Controller agent, voice Fixed Mobile Coverage ("FMC") functionality provided by the NFV EPC data plane modules and local voice services running in the MEC Appliance, and a NFV EPC data plane module. Exemplary third party applications are shown to be a Content Delivery Node ("CDN"), an Enterprise App public web interface, and a Video Analytics Probe. The MEC Appliance can provide core data processing features, which may include, but are not limited to: 1) Caching—selective caching and/or storage of content on a local appliance via third party caching applications; 2) Local Breakout, also referred to as Local IP Access—routing of select traffic to a local service or locally attached server; and 3) Edge Switch Port Analyzer ("SPAN")—mirroring of all traffic for data analysis.

Instead of small cell radios initiating an IPSec tunnel to a MNO's security gateway, the MEC Appliance can install itself in that data path, acting as an IPSec server to the small cell radio and an IPSec client device to the MNO's security gateway servers. Thus, the function and control of the small cell radios do not have to change under this topology. Rather, the MEC Appliance can add new data processing functions prior to being transmitted to the network operator's core network. This feature alone can make the MEC Appliance well suited for operation in hostile, untrusted environments, such as outdoor stadiums or common office areas for example.

The MEC Controller can provide a centralized provisioning and management platform for mobile edge computing appliances, functions, and services via a plurality of platform modules. These may include, but are not limited to, a Core Services Platform, a Carrier Services Gateway, an Enterprise Services Gateway, an Appliance Services Agent, and a Discovery Service. Collectively, the platform modules may provide the following core services: 1) centralized orchestration of hardware and software components of all computing appliances within the at/near network perimeter environment; 2) select aggregation and normalization of third party APIs for services running within the at/near network perimeter environment; 3) lifecycle and configuration management of appliance firmware and software (including the operating environment), core appliance software features, and third party software; 4) centralized reporting and capacity planning; and, 5) RBAC, MEC Appliance, and user provisioning with integration into existing EPC modules and third party infrastructure.

Figure 2:
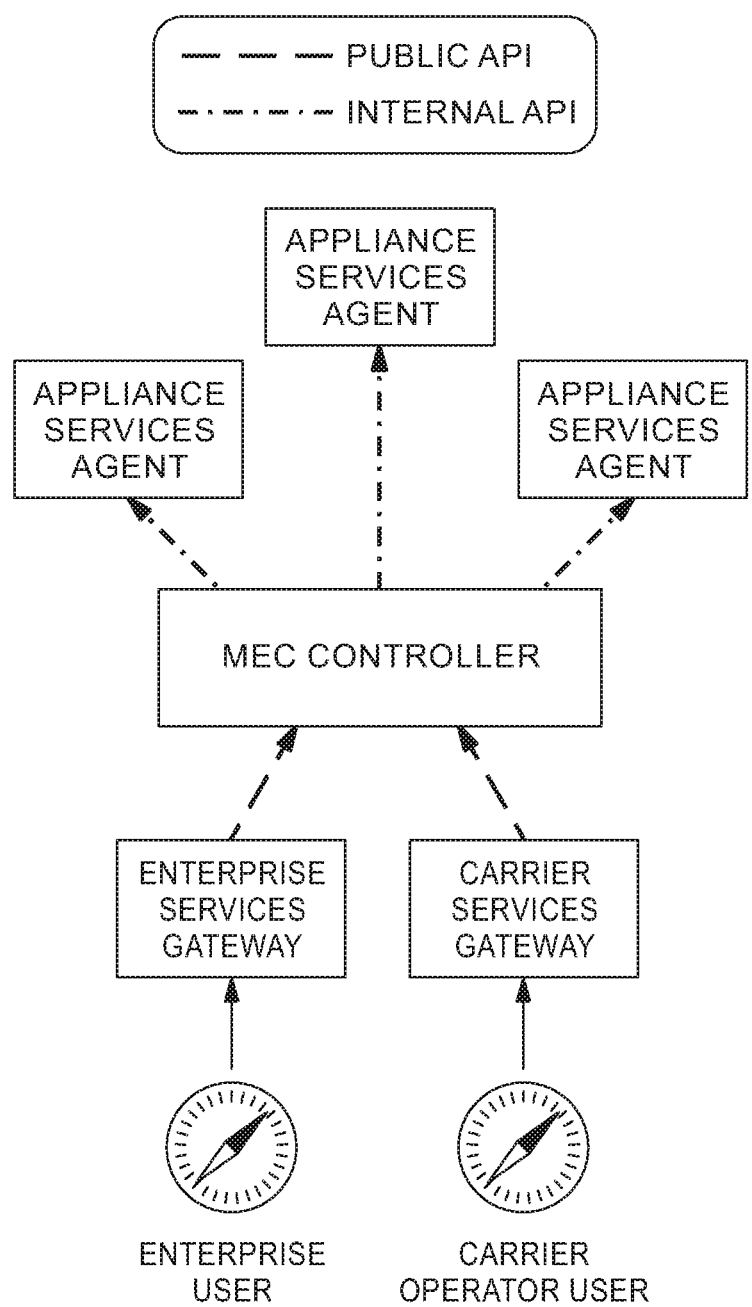
FIG. 2 shows an exemplary MEC Controller that may be used with the MEC Appliances deployed in the field.

FIG. 2 shows an exemplary topology and the relation between the various components. The Core Services Platform may function as the core of the MEC Controller, and it can perform all of the processing for control plane and operational services. For example, the Core Services Platform can be designed as a micro-services architecture providing the central control and aggregation of all capabilities provided by the platform. This design can isolate the scope of specific functions to a set of dedicated instances for independent scaling, fault, and attack vector isolation. The Enterprise Services Gateway and Carrier Services Gateway are public interfaces for providing web user interfaces for a client device user and a carrier operator user, respectively, and will be discussed in more detail later.

Figure 3:
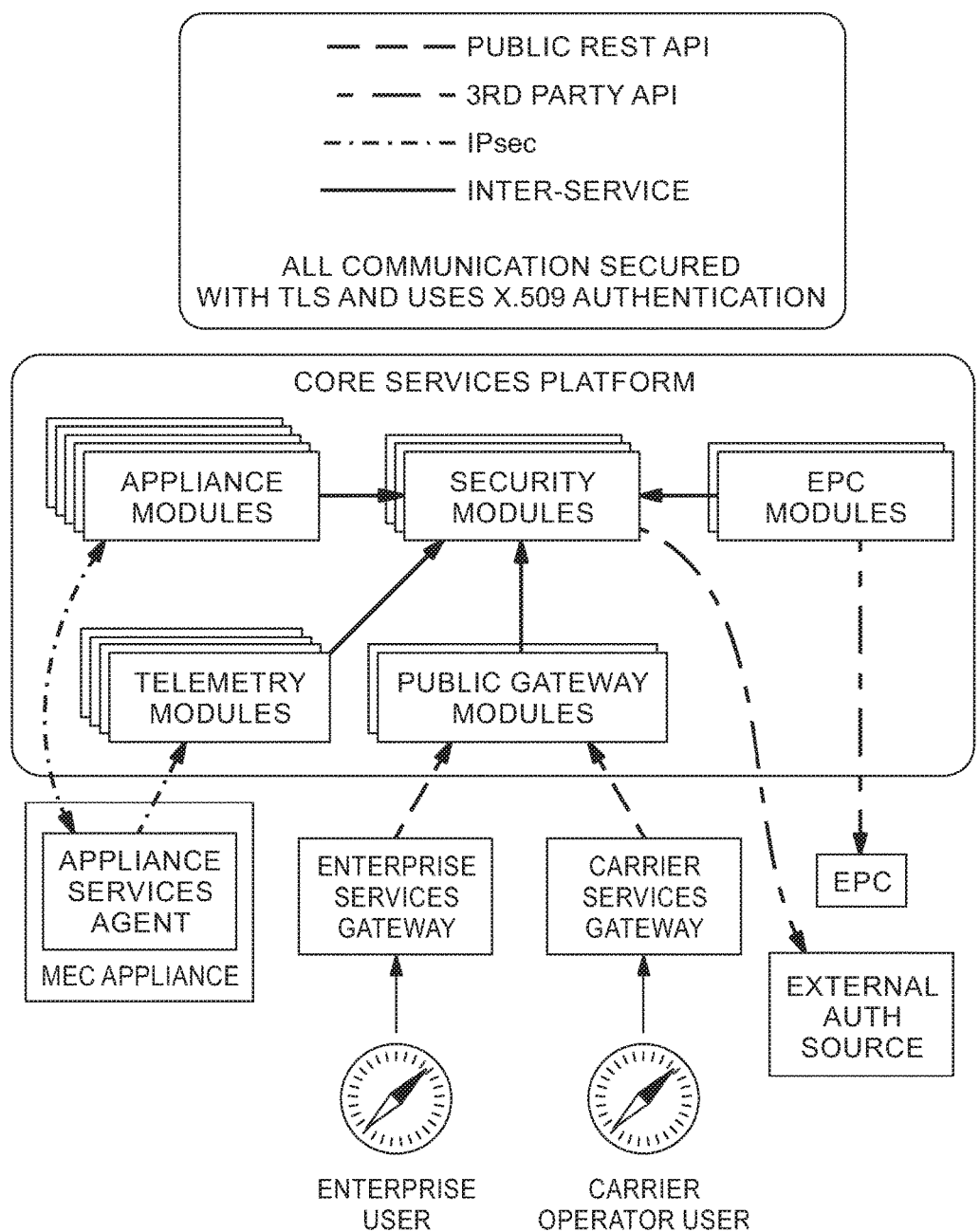
FIG. 3 shows an exemplary Core Services Platform micro-services architecture that may be used for the MEC Controller.
Figure 4:
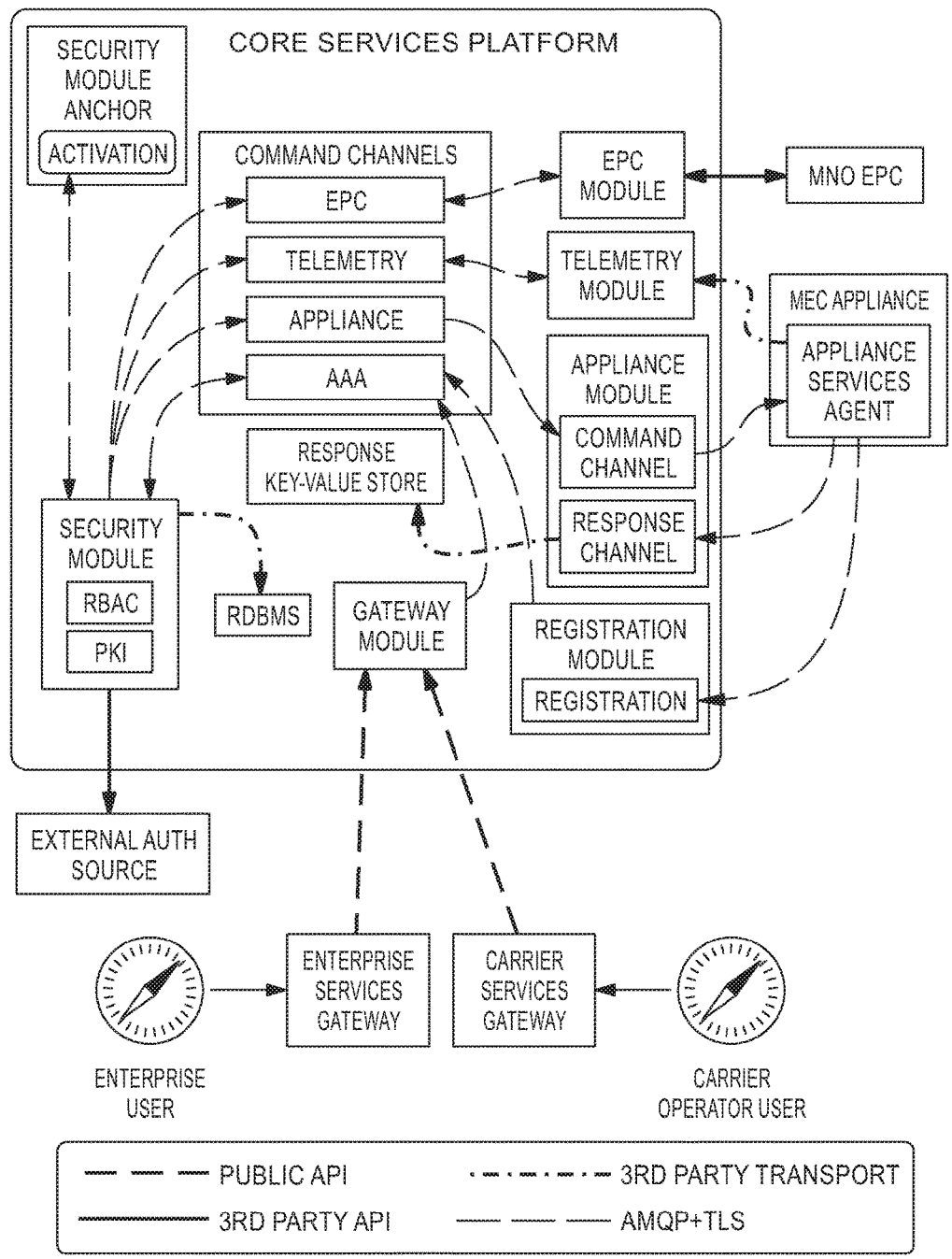
FIG. 4 shows an exemplary architectural design for a messaging architecture that may be used with the inventive platform.

As shown in FIGS. 3-4, the Core Services Platform can include a plurality of components and/or modules. These can include, but are not limited to: 1) a Security Module; 2) an Appliance Module; 3) a Telemetry Module; 4) an EPC Module; and, 5) a Public Gateway Module. The Core Services Platform can communicate with each micro-service through a standardized API, as shown in FIG. 3 as the inter-service API.

The Security Module can cryptographically authenticate and sign all actions via support of issued X.509 certificates. In some implementations, actions can be authorized against a desired scope for a given principle (e.g., user or service). The Security module can use Federal Information Processing Standard ("FIPS") 186-4 and/or National Security Agency ("NSA") Suite B standards. The Security module can be further configured to explicitly authorize and track every action with built-in RBAC and auditing capabilities. All services in and principles can provide their identity via an X.509 certificate issued for a Digital Identity.

Figure 9:
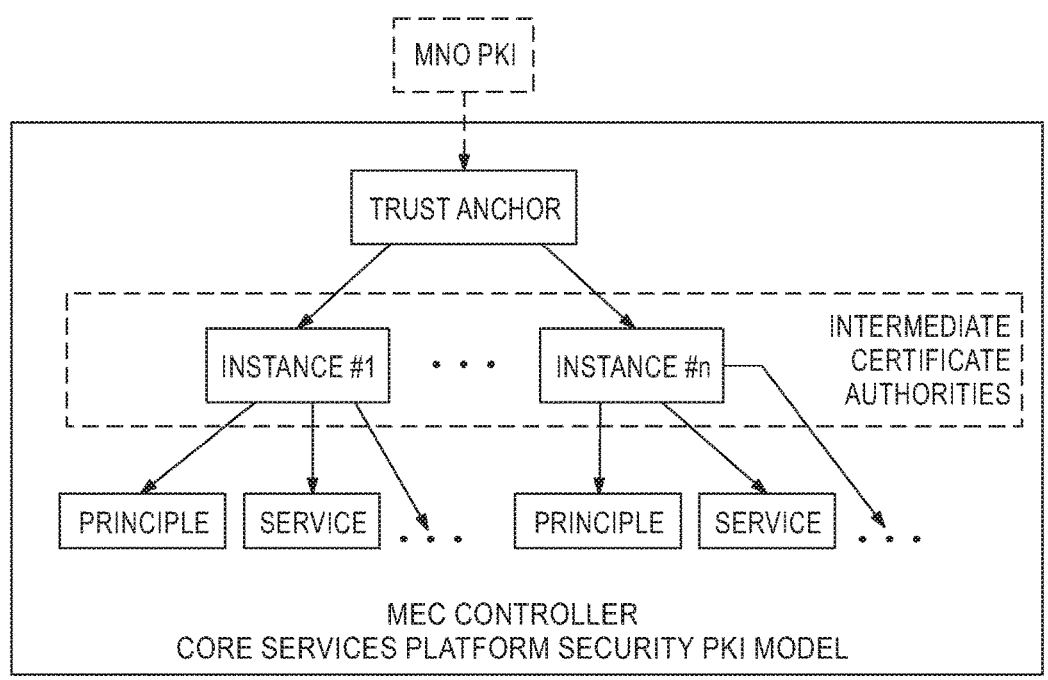
FIG. 9 shows an exemplary PKI implementation scheme that may be used by the Security Module.

Referencing FIG. 9, the Security Module PKI topology can have a Trust Anchor that either implements a Root Certificate Authority ("CA") or an Intermediate CA signed by an existing PKI managed by the MNO. Each Security Module can act as an Intermediate CA to the Trust Anchor, and any one Security Module instance can issue a digital identity to a principle and be used to validate the certificate chain for all services via the Online Certificate Status Protocol ("OCSP").

The Appliance Module can be configured for a one-to-many management of MEC Appliances. For example, the Appliance Module can facilitate communication with deployed MEC appliances. The Appliance Module can facilitate life cycle management of applications and appliances. The Appliance Module can be further configured to maintain persistent communications with appliances, and can be made to scale horizontally to allow for up to 100,000+ appliances to be added. Thus, the module may simplify orchestration and integration to North Bound Business Support Systems ("BSS") and Operational Support Systems ("OSS") Platforms. The Appliance Module may manage the tracking of the state of asynchronous commands sent to MEC Appliances, providing the other Modules with an abstraction to observe the final state of a request. The Appliance Module may also manage the distribution of authenticated and authorized messages received from the Core Services Platform to one or more MEC Appliances, as instructed in the authenticated message.

The Telemetry Module can be used for statistics and logging. For example, all events and metrics from both the MEC appliances and the MEC Controller can be captured by the Telemetry Module. The Telemetry Module can also support trigger based actions, provide a near real-time analysis of the entire environment, and offload telemetry analysis from MEC Appliances. In some implementations, all event data processing is conducted via the Telemetry Module. This may reduce the computational resource requirement of the appliance, as compared to performing the event data processing elsewhere. The Telemetry Module may also provide an interface for event processing from third party applications used in support of the Core Services Platform. For example, the control plane element of the Serving Gateway ("SGW") may send proprietary notifications to a listening service that is part of the Telemetry Module. The Telemetry Module may provide callback capabilities, specifically the ability to notify a different service if a threshold has been exceeded or if specific events have occurred. This can allow for asynchronous push notifications to appropriate services for the types of conditions that those services wanting to receive notifications, which can be used for further handling and processing.

The EPC Module can communicate with the MNO's EPC components, and thus enable integration and communication with the MNO EPC for network provisioning and policy enforcement. The EPC Module can contain NFV EPC control-plane SGW and Packet Data Network Gateway ("PGW") elements. The EPC Module can be further configured to perform policy and user changes, as well as support Gx, S5, and S11 interfaces. The EPC Module can further provide for the addition or removal of data plane instances running in MEC Appliance when the MEC Appliance is either deployed or decommissioned, respectively.

The Public Gateway Module can provide a public REST API to the MEC Controller and/or the MEC Appliance, and thus enable providing a REST API endpoint to the platform for outside services and users. The inventive platform can be configured such that the Public Gateway Module is the only public interface for third party consumers to access the Core Services Platform. In other words, the only way to interface with the inventive platform would be through the REST API of the Public Gateway Module. The Public Gateway Module can be configured such that all access to the network is authorized by an operator (e.g., via a MEC identity store). The Public Gateway Module can further configured to use AAA authentication frameworks provided by the Security Module for the purpose of authorizing connection attempts, support web user interface gateways, and can be built as to stand alone or to further extend or consume existing client portals REST APIs.

Integration with the MEC Controller can be done strictly through a REST API provided by the Public Gateway Module within the Core Services Platform, allowing for third party integration and control in conjunction with, or as a replacement to, the Enterprise Services and/or Carrier Services Gateways. Thus, user interaction with the Core Services Platform can be performed through either of the Enterprise Services and/or Carrier Services Gateways or through a third party product compliant with the Core Services Platform Public Gateway API.

Furthermore, the platform can be structured such that control of any MEC Appliance is solely restricted to a secure persistent connection between the appliance and the Core Services Platform. As described above, control of any MEC Appliance can be central to the function of the Core Services Platform. Thus, the core of the security framework can be implemented by and provided by the Security Module within the Core Services Platform. This suite of software can be responsible for granting access to any component that intends to communicate with the network. The Security Module can also cryptographically sign all commands for other services to validate the integrity and validity of any command.

Referring to FIG. 4, the security framework can also be implemented throughout the Core Services Platform such that no module is trusted to communicate to another without explicit authentication using, for example, X.509 certificates. Internally, all communication between modules of the Core Services Platform (inter-service API) can be handled by a proprietary JavaScript Object Notation ("JSON") message format, transported via Advanced Message Queuing Protocol ("AMQP") that abstracts the implementation of any one module from another. The message exchanged may be of a uniform format, referred to as a Command Message, representing the scope, action, and parameters for an action requested to be executed on the receiving micro-service. The standardized Command Message format can allow for disparate micro-services to communicate without a dependency on the design or architecture of the remote micro service.

The AMQP compliant message bus may provide secure, isolated, and/or controlled delivery of messages between services, and can be used to implement synchronous communication, such as Remote Procedure Call ("RPC"), or asynchronous communication. Furthermore, the message bus may allow for isolated fault domains so that any one given micro-service is not responsible for managing the state or communication with a remote micro-service. The core services platform may use a JSON key-value store for tracking and recording the state of asynchronous commands invoked on a remote micro-service.

Thus, messaging protocol can allow for complete architectural isolation of a given module, allowing for independence without impacting other modules for the purposes of: 1) changing the underlying implementation of the module; 2) extending or adding features; 3) increasing or decreasing the number of module instances in production; 4) fault isolation; and 5) attack vector isolation. Such a design can further make the Core Services Platform dynamically scalable in any cloud hosting environment. If additional or more verbose telemetry data needs to be collected, for example, additional Telemetry Module can be deployed to handle the additional processing requirements without affecting the other modules. This scaling scheme can be applied to any module within the Core Services Platform, allowing for resources to be allocated only to the precise functions that need it.

Figure 5:
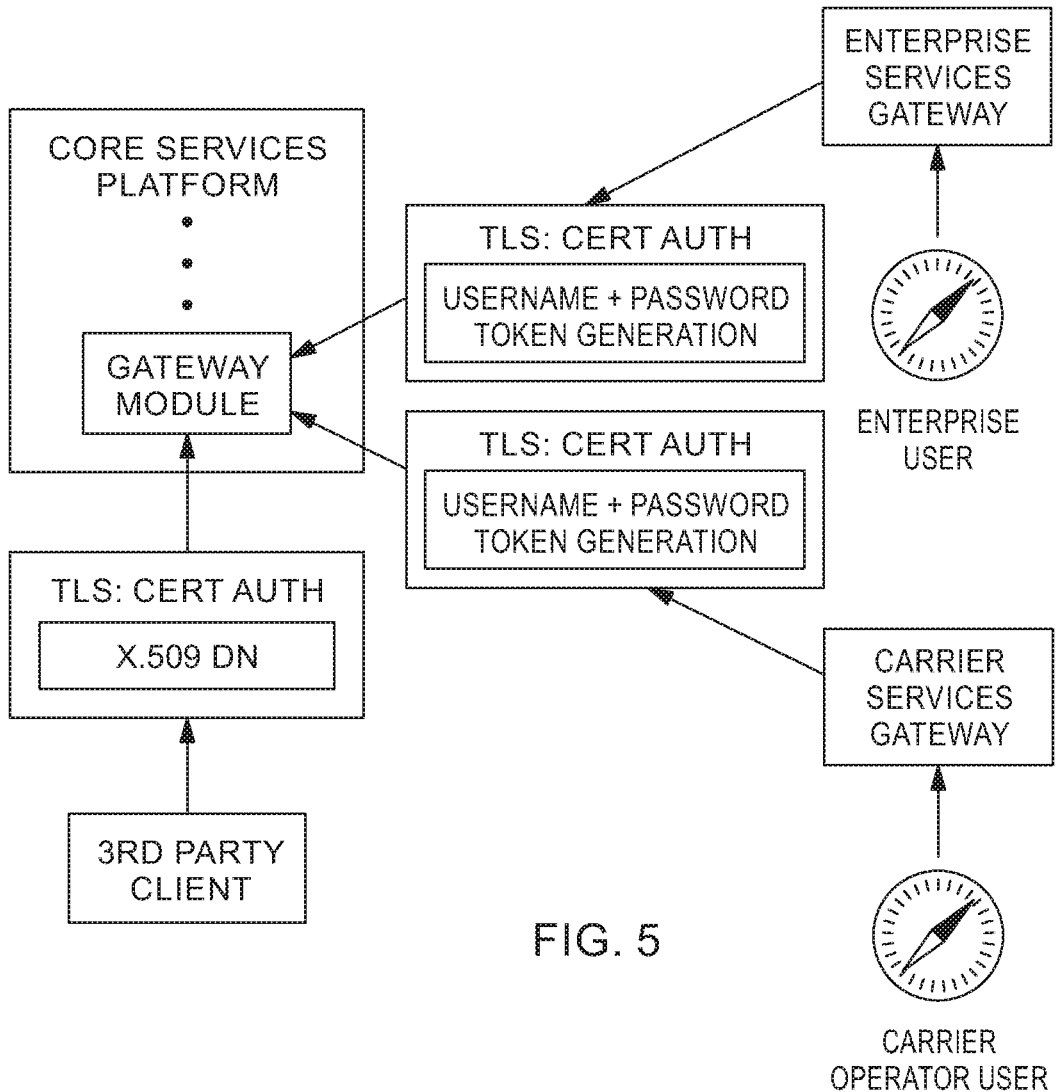
FIG. 5 shows an exemplary authentication implementation scheme through a Public Gateway module that may be performed by the inventive platform.

As noted above, the Core Services Platform component of the MEC Controller can provide the REST API. The Enterprise and Carrier Services Gateways can provide web user interfaces that implement a REST client to the MEC Controller. These Enterprise and Carrier Services Gateways can be made to serve the sole function of providing a human interface to the environment. As shown in FIG. 5, the Enterprise and Carrier Services Gateways can implement the certificate authentication as required by the MEC Controller and implement and proxy traditional user authentication methods. Thus, the inventive platform can be configured such that the Enterprise and Carrier Services Gateways are optional components of the platform. For example, external services that implement user interfaces for the control of the MNO's environment can consume the REST API without requiring the presence of the Enterprise and Carrier Services Gateways. External services can consume the REST API directly by developing a REST client that is compliant with the MEC Controller Public REST API Gateway specification, and by using an issued X.509 digital identity certificate to open an authenticated connection with the REST API.

The Appliance Services Agent can serve as the interface between all components and services running in the MEC Appliance, with those services being managed by the MEC Controller. While the MEC Controller is not required for the MEC Appliance to process data over the mobile network, the platform can be configured such that any command and control functions may only be issued from the MEC Controller. For example, when a new MEC Appliance (placed at an edge of the perimeter of the mobile network) is initialized and joined to the network, the Appliance Services Agent can be responsible for communicating with the Core Services Platform to update the EPC control plane elements, thus establishing control over an EPC data plane module residing within the appliance. Thus, the Appliance Services Agent can provide a means to securely manage the ecosystem of MEC Appliances within, at and/or near the network perimeter environment. Furthermore, the Appliance Services Agent can provide API translation and localized messaging and notification between third party applications running in the MEC Appliance. For example, the Appliance Services Agent may relay data needed for processing location information, or it may forward location information from one service to another, both running locally and brokered by the Appliance Services Agent.

Figure 6:
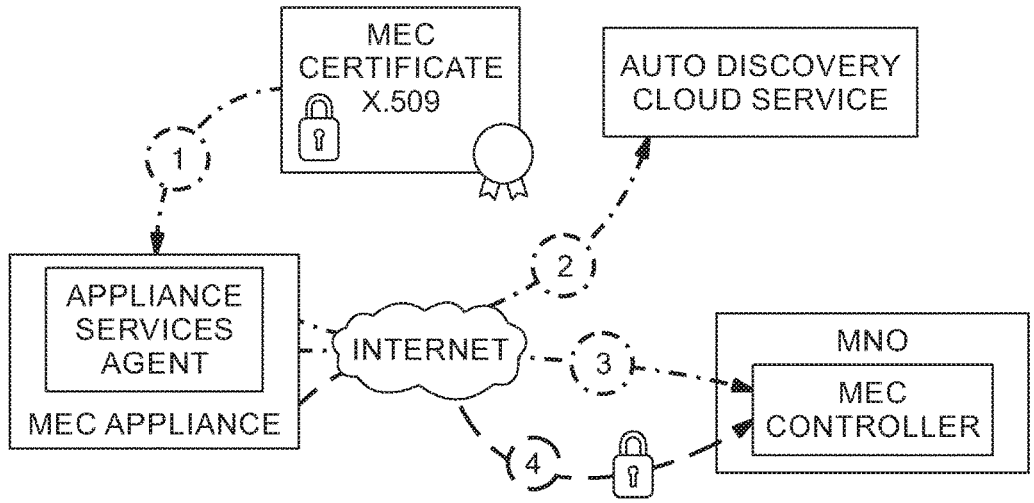
FIG. 6 shows exemplary processing steps that may be performed by a Discovery Service module for registering a new MEC Appliance.

The Discovery Service can be a component of the inventive platform that can be responsible for the provisioning of an MEC Appliance in the field (i.e., within, at and/or near the network perimeter environment), which can include autonomous provisioning. The Discovery Service may reside outside of the MNO. The Discovery Service can allow a new factory delivered MEC Appliance to register with the MNO, establishing encryption keys and signed X.509 digital identity certificates specific to the MNO for all communication and authentication. For example, a client device can connect to the network operator to register and obtain a certificate automatically (i.e., autonomous provisioning) by merely powering on the client device. A separate function and/or operation can approve the client device joining the network, but the process of authenticating and validation can be made automatic via the Discovery Service. FIG. 6 shows the processing steps that may be involved, which can include communication between the MEC Appliance, the cloud-hosted Discovery Service, and the MEC Controller running within the MNO to ensure that no private keys are shared or transmitted at any time during autonomous provisioning. This process may include use of TLS client authentication.

As noted above, the inventive platform can provide for Cloud Edge computing at and/or near the network perimeter. MNO and/or client device users with appliances located in the field can easily and effectively scale up and/or down based on demand, with minimal or no disruption to modules within the platform. This can be done, in part, by de-centralizing the MNO's core network, resulting in a plurality of small systems managed by a zero-trust Security Module. The platform can deploy mobile applications at the network perimeter edge, resulting in the mobile application located in closest proximity to an end user that is technically possible. De-centralizing the MNO's core network can further facilitate enhanced scaling management to meet data flow demand without disruption to modules and without adjustments to the security framework every time an appliance is added. In addition, the MEC Appliance can verify the validity of all communication and commands sent from the MEC Controller. Thus, if a client device sends a command to an appliance (e.g., to reboot the client device), the MEC Appliance, in addition to the system, can validate this action.

As noted above, the Telemetry Module can capture all events and metrics from both the MEC Appliance and the MEC Controller, thus every event that occurs at an MEC Appliance can be sent to the Telemetry Module. If a client device user issues a request that cannot be performed by the MEC Appliance, that event can be recorded by the Telemetry Module. This information can be used to update the appliance so that subsequent requests for the same can be performed.

Figure 7:
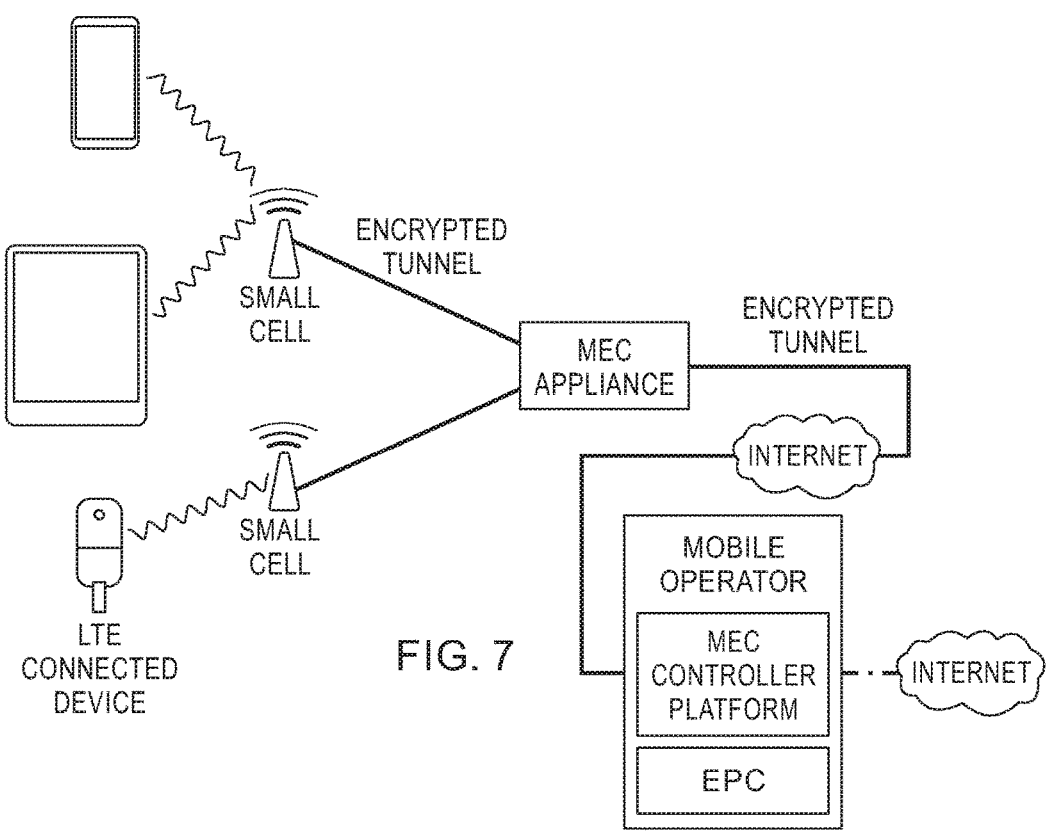
FIG. 7 shows an exemplary high level architecture of the inventive platform including both the MEC Appliance and MEC Controller in relation to a radio network, a network operator, and the Internet.

Referring to FIG. 7, an exemplary high level architecture of the inventive platform is disclosed. This embodiment shows a platform with both the MEC Appliance and MEC Controller in relation to a radio network, a network operator, and the Internet. In the diagram, the MEC Appliance is shown to be residing at the mobile edge and in communication with at least one small cell radio and an MNO EPC vendor via encrypted tunnels formed by the Security Module.

Figure 8:
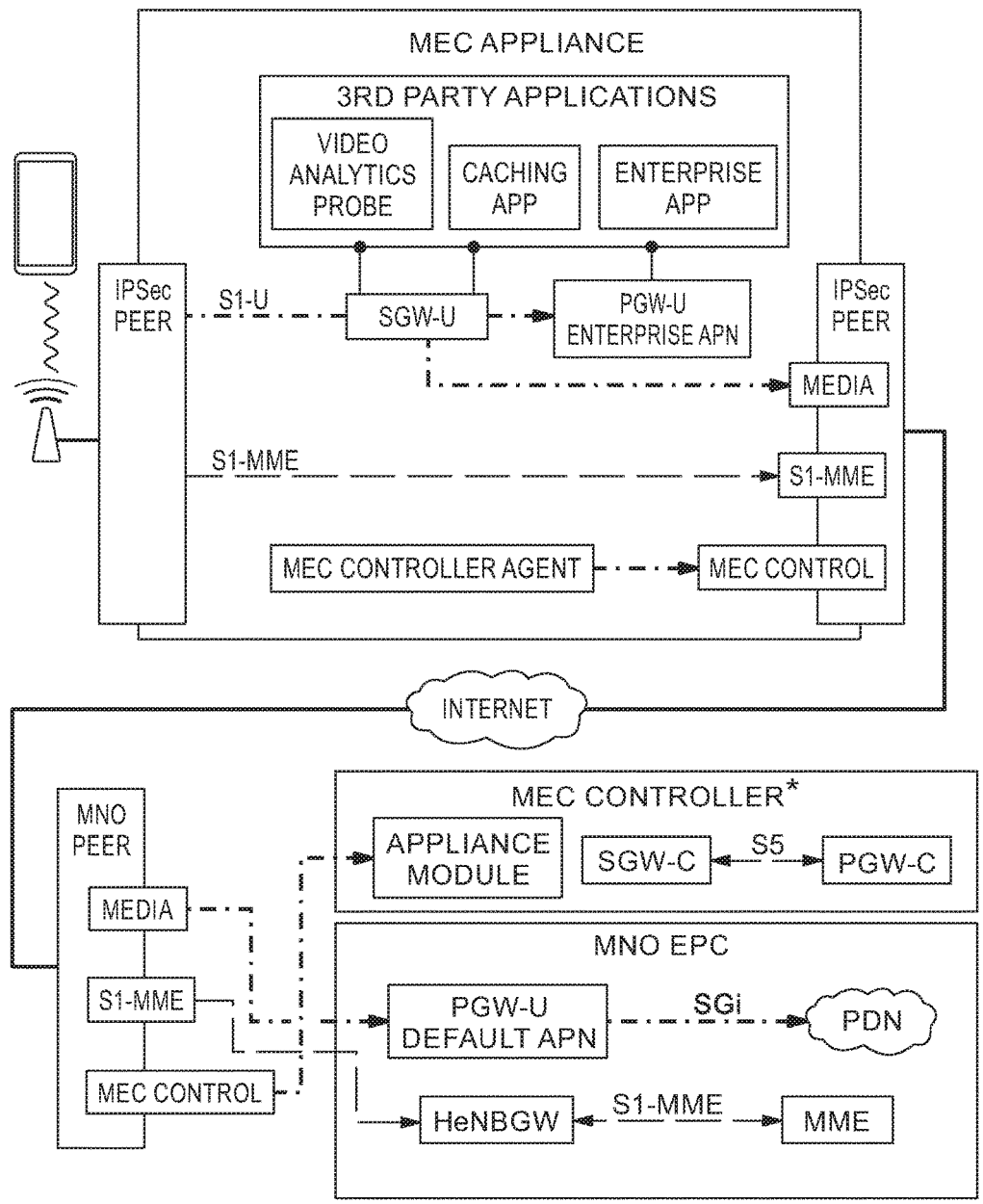
FIG. 8 shows an exemplary 3GPP control and data plane architecture of third party NFV EPC components, in addition to the MEC Controller agent architecture, in the inventive platform.

FIG. 8 shows an exemplary 3GPP control and data plane architecture of third party NFV EPC components, in addition to the MEC Controller agent architecture, which may be used in the architecture of FIG. 7.

FIG. 9 shows an exemplary PKI implementation scheme or PKI topology that may be used by the Security Module, which demonstrates various instances of the Security Module that may occur through the trust anchor.

Figure 10:
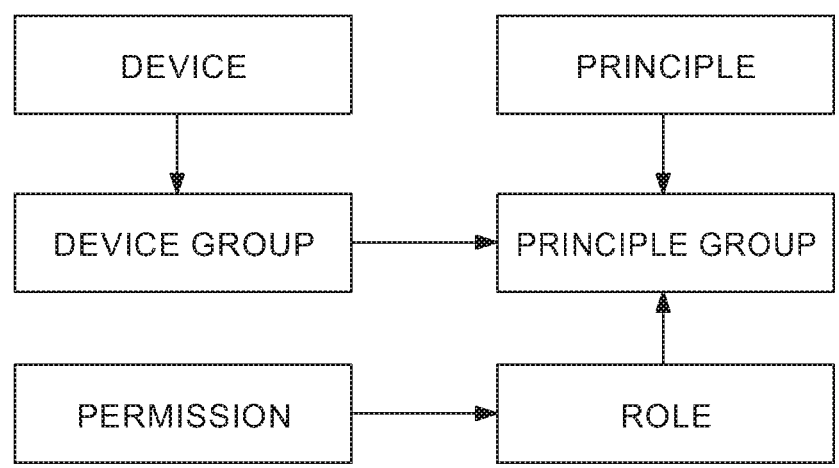
FIG. 10 shows an exemplary RBAC implementation scheme that may be used by the Security Module.

FIG. 10 shows an exemplary RBAC implementation scheme that may be used by the Security Module.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

We claim:

1. A platform for computing within a wireless network, comprising:
  a Mobile Edge Compute ("MEC") Appliance comprising a hardware device capable of providing data services and security mechanisms for running programs associated with third party providers on a privately managed network, the MEC Appliance being placed at or near an edge of the privately managed network;
  a MEC Controller capable for command and control of the MEC Appliance, the MEC Controller residing within a core network of the mobile network operator ("MNO") and de-centralizing the MNO's core network; and
  a Security Module comprising a plurality of components establishing a plurality of layers, each component structured to address various attack vectors and potential exploits at each layer, the Security Module being integral to a function of the MEC Controller and for which extends throughout the MEC Appliance, the plurality of layers comprising:
    a first security layer encrypting keys stored on the MEC Appliance;
    a security second layer verifying the integrity of an operating environment within the privately managed network; and
    a security third layer for controlling interaction with network elements;
  wherein the platform provides computational resources for hosting at least one third party application within an environment that is at least one of at a network perimeter of the privately managed network and near the network perimeter of the privately managed network, and
  wherein the Security Module validates any action by any platform component within the environment that is at least one of at the network perimeter of the privately managed network and near the network perimeter of the privately managed network before being granted access to the privately managed network.

2. The platform recited in claim 1, wherein the MEC Appliance is capable to serve as a data plane.

3. The platform recited in claim 1, wherein MEC Controller is capable to serve as a control plane.

4. The platform recited in claim 1, wherein the environment that is at least one of at the network perimeter of the privately managed network and near the network perimeter of the privately managed network is a distributed topology.

5. The platform recited in claim 1, wherein the MEC Appliance is placed in-line between a small cell radio and a MNO.

6. The platform recited in claim 5, wherein the MEC Appliance installs itself in a data path defined by an Internet Protocol security ("IPSec") tunnel to the MNO's security gateway, acting as an IPSec server to the small cell radio and an IPSec client device to the MNO's security gateway servers.

7. The platform recited in claim 1, wherein the MEC Controller further comprises a Core Services Platform designed as a micro-services architecture, providing central control and aggregation of all capabilities provided by the platform, capable of isolating a scope of specific functions to a set of dedicated instances for independent scaling, fault, and attack vector isolation.

8. The platform recited in claim 7, wherein the Core Services Platform further comprises: an Appliance Module for communication with deployed MEC appliances; a Security Module for white-listed access and control of the platform; an EPC Module for integration and communication with the MNO EPC for network provisioning and policy enforcement; a Telemetry Module for statistics and logging; and a Public Gateway Module for providing a REST API endpoint to the platform for outside services and users.

9. The platform recited in claim 8, wherein the Telemetry Module is capable of capturing all events and metrics from both the MEC Appliance and the MEC Controller.

10. The platform recited in claim 8, wherein all event data processing is conducted via the Telemetry Module.

11. The platform recited in claim 1, where the hardware device comprises an x86 hardware device.

12. The platform recited in claim 1, further comprising a Discovery Service module responsible for provisioning of the MEC Appliance within the environment that is at least one of at the network perimeter of the privately managed network and near the network perimeter of the privately managed network.

13. A platform for computing within a network system, comprising:
    a wireless network capable of connecting with a privately managed network;
    a plurality of client devices, each associated with the privately managed network;
    at least one server, being part of the wireless network, acting as a gateway between the wireless network and the privately managed network, enabling communication between each client device and the server;
    an access node facilitating wireless connectivity between the plurality of client devices and the wireless network;
    a Mobile Edge Compute ("MEC") Appliance comprising a hardware device capable of providing data services and security mechanisms for running programs associated with third party providers on the privately managed network, the MEC Appliance being placed at or near an edge of the privately managed network;
    a MEC Controller capable for command and control of the MEC Appliance, the MEC Controller residing within a core network of the MNO and de-centralizing the MNO's core network; and
    a Security Module comprising a plurality of components establishing a plurality of layers, the Security Module validating any action by any platform component establishing communication with the MNO network;
    wherein the plurality of layers comprises:
        a first security layer encrypting keys stored on the MEC Appliance;
        a security second layer verifying the integrity of an operating environment within the privately managed network; and
        a security third layer for controlling interaction with network elements; and
    wherein the platform provides computational resources for hosting at least one third party application used on at least one client device.

14. The platform recited in claim 13, wherein the MEC Controller is further configured to de-centralize macro-cell network topologies associated with the MNO network.

15. The platform recited in claim 13, wherein the MEC Appliance is capable to serve as a data plane.

16. The platform recited in claim 13, wherein MEC Controller is capable to serve as a control plane.

17. The platform recited in claim 13, wherein the MEC Appliance installs itself in a data path defined by an Internet Protocol security ("IPSec") tunnel to the MNO's security gateway, acting as an IPSec server to the access node and the IPSec client device to the MNO's security gateway servers.

18. The platform recited in claim 17, wherein the MEC Appliance is placed in-line between the access node and a MNO.

19. The platform recited in claim 17, wherein the access node is a small cell radio.

20. The platform recited in claim 13, wherein the MEC Controller further comprises a Core Services Platform designed as a micro-services architecture, the Core Services Platform providing central control and aggregation of all capabilities provided by the platform, and capable of isolating a scope of specific functions to a set of dedicated instances for independent scaling.

21. The platform recited in claim 20, wherein the Core Services Platform further comprises a Telemetry Module capable of statistics and logging.

22. The platform recited in claim 13, further comprising a Discovery Service module responsible for provisioning of the MEC Appliance.

23. The platform recited in claim 13, where the hardware device comprises an x86 hardware device.

24. A platform for computing within a wireless network, comprising:
    a Mobile Edge Compute ("MEC") Appliance comprising an x86 hardware device capable of providing data services and security mechanisms for running programs associated with third party providers on a privately managed network, the MEC Appliance being placed in-line between a small cell radio and an MNO;
    a MEC Controller capable for command and control of the MEC Appliance, the MEC Controller residing within the MNO's core network and de-centralizing the MNO's core network, the MEC Controller comprising:
        a Core Services Platform designed as a micro-services architecture, providing central control and aggregation of all capabilities provided by the platform, capable of isolating a scope of specific functions to a set of dedicated instances for independent scaling, the Core Services Platform comprising:
        a Security Module providing Authentication, Authorization, and Accounting to cryptographically authenticate and sign all actions;
        an Appliance Module configured for a one-to-many management of a plurality of MEC Appliances;
        a Telemetry Module configured capable of statistics and logging;

an Evolved Packet Core ("EPC") Module configured for communication with the MNO's EPC components; and a Public Gateway Module configured to provide the only public interface for the third party providers to access the Core Services Platform;

an Enterprise Services Gateway and a Carrier Services Gateway capable of providing web user interfaces for a client device user and a carrier operator user, respectively;

an Appliance Services Agent to serve as an interface between all components and services running in the MEC Appliance; and a Discovery Service module as a component of the platform responsible for provisioning of the MEC Appliance; and a Security Module comprising a plurality of components establishing a plurality of layers, each component structured to address various attack vectors and potential exploits at each layer, the Security Module being integral to a function of the MEC Controller and for which extends throughout the MEC Appliance, the plurality of layers comprising:

a first security layer encrypting keys stored on the MEC Appliance;

a security second layer verifying the integrity of an operating environment within the privately managed network; and a security third layer for controlling interaction with network elements;

wherein the platform provides computational resources for hosting at least one third party application within an environment that is at least one of at a network perimeter of the privately managed network and near the network perimeter of the privately managed network; and wherein the Security Module validates any action by any platform component within the environment that is at least one of at the network perimeter of the privately managed network and near the network perimeter of the privately managed network before being granted access to the privately managed network.

* * * * *